United States Patent [19]

Schumacher

[11] Patent Number: 5,559,288

[45] Date of Patent: Sep. 24, 1996

[54] VOLUME SENSOR FOR LIQUIDS USING TOOTHED METER WHEELS

[75] Inventor: Johannes A. Schumacher, Werdohl, Germany

[73] Assignee: VSE Schweisstechnik GmbH, Neuenrade 2, Germany

[21] Appl. No.: 568,739

[22] Filed: Dec. 7, 1995

Related U.S. Application Data

[63] Continuation of Ser. No. 374,994, Jan. 18, 1995, abandoned, which is a continuation of Ser. No. 227,190, Apr. 13, 1994, abandoned, which is a continuation of Ser. No. 808,018, Dec. 16, 1991, abandoned.

[30] Foreign Application Priority Data

Dec. 18, 1990 [DE] Germany .......................... 40 40 409.9

[51] Int. Cl.[6] ........................................................ G01F 3/04
[52] U.S. Cl. ........................ 73/261; 418/190; 418/206.1
[58] Field of Search ............................. 73/261, 861.77, 73/861.87, 253; 418/206, 189, 190

[56] References Cited

U.S. PATENT DOCUMENTS

| | | | |
|---|---|---|---|
| 1,129,090 | 2/1915 | Hawley . | |
| 2,354,992 | 8/1944 | Gottlieb | 418/189 |
| 3,274,894 | 9/1966 | Junger | 418/206 |
| 3,303,792 | 2/1967 | Littlewood | 418/189 |
| 4,400,147 | 8/1983 | Springer et al. | 418/206 |
| 4,409,829 | 10/1983 | Weber | 73/261 |
| 4,911,010 | 3/1990 | Foran, Jr. et al. | 73/261 |

FOREIGN PATENT DOCUMENTS

| | | |
|---|---|---|
| 366152 | 12/1922 | Germany . |
| 2554466 | 8/1978 | Germany . |
| 3321952 | 12/1984 | Germany . |
| 0305733 | 7/1988 | Germany . |
| 0393294 | 5/1989 | Germany . |

Primary Examiner—Wellington Chin
Assistant Examiner—Timothy J. May
Attorney, Agent, or Firm—Salter & Michaelson

[57] ABSTRACT

A volume sensor for liquids comprising a measuring chamber in which toothed meter wheels mesh with one another and are mounted on stationary pivots. Flow paths are formed in at least one of the measuring-chamber end walls and are separated by a web in the pivot plane, the edges of which are substantially symmetrical with the pivot plane. The tooth spaces of the meter wheels, at least on the side facing the flow paths, are formed with a recess which extends radially inwards compared with the root circle and is symmetrical in respect to the tooth space. The web is constructed so that whenever a tooth space of the two meter wheels is in the centre position in the pivot plane, the edges of the web substantially coincide in shape with the neighbouring flanks of the teeth adjacent the tooth space so that the latter is cut off from the flow paths in the end walls. The flow paths allow the liquid pressure to be reduced before the tooth space is closed off.

6 Claims, 3 Drawing Sheets

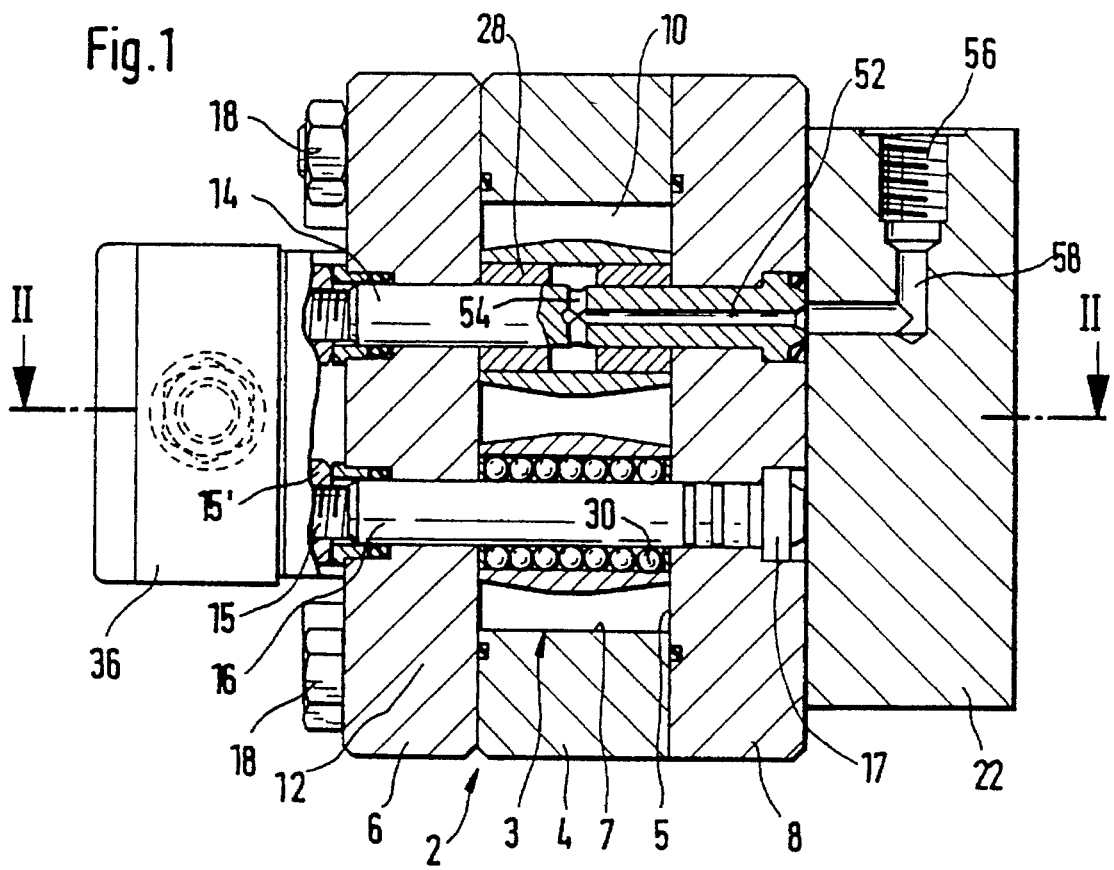
Fig.1
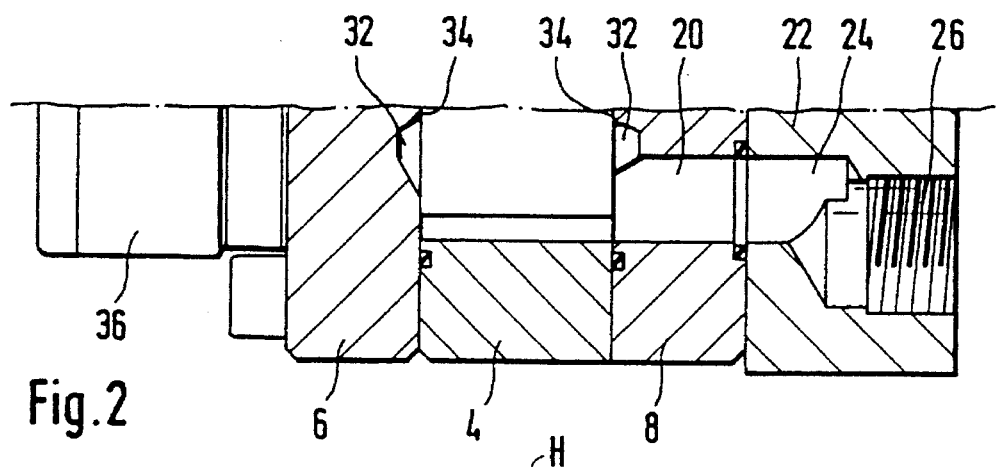
Fig.2
Fig.3

VOLUME SENSOR FOR LIQUIDS USING TOOTHED METER WHEELS

This is a continuation of application Ser. No. 08/374,994 filed on Jan. 18, 1995, now abandoned which is a continuation of Ser. No. 08/227,190 filed on Apr. 13, 1994 (now abandoned), which is a continuation of Ser. No. 07/808,018 filed on Dec. 16, 1991 (now abandoned).

The invention relates to a volume sensor for liquids.

BACKGROUND OF THE INVENTION

Volume sensors are known which employ rotating toothed meter wheels which pass small quantities repeatedly, as defined by the transfer spaces between the teeth. A signal pulse for each small quantity is delivered by a magneto-electric sensor. The resulting measurement is simple, by addition of electric pulses, each assigned to a preset amount of liquid (German utility model 66 09 610, DE-AS 25 54 466, DE-PS 31 47 208).

Volume sensors of this kind are used in liquid-conveying conduits, and the gearwheels are driven by the flowing liquid. At high flow rates, particularly when using gearwheels having a small radius and with consequently small transfer quantities, there is a considerable increase in the flow resistance and a consequent throttling of the flow of liquid, which upwardly limits the measuring range. Another inevitable result hitherto has been considerable noise, which is extremely disturbing.

In known volume sensors (DE-PS 31 47 208) the differential magnetoresistors are inserted from the exterior into blind bores which are internally sealed from the measuring chamber by an insert of non-magnetic material. These non-magnetic inserts usually have a thickness of a few millimetres, so that a considerable air gap is left between the end faces of the teeth and the magnetoresistors. The insert also protects the differential magnetoresistor sensor, assumed to be very pressure-sensitive, against the pressure inside the volume sensor.

At high rotation speeds of the meter wheels, and also at elevated operating temperatures, which may be reached by the aforementioned volume sensors, it becomes more difficult to obtain a clear signal via a differential magnetoresistor sensor disposed in the region of the teeth.

An attempt has already been made to solve this problem by disposing one or more magnetically conductive pole pins in the non-magnetic insert (De-PS 31 47 208, EP 0 393 294 A1).

SUMMARY OF THE INVENTION

The aim of the invention is to improve volume sensors of the aforementioned kind so that both the flow resistance and the noise are substantially reduced.

This problem is solved according to the invention by a volume sensor for liquids which comprises: a measuring chamber having an inlet side and an outlet side, the two sides being separated by a plane; two toothed meter wheels rotating on respective fixed pivot axes and engaging at their respective pitch circles, said plane being defined by the plane of the two pivot axes; said wheels having flat end faces and the measuring chamber having chamber walls which surround closely the peripheries of the two meter wheels, whereby fluid can only pass from the inlet side to the outlet side of the measuring chamber when carried through said plane in a transfer pocket formed between the teeth of the rotating meter wheels; both said meter wheels having teeth with a root circle, and recesses radially inwards of the root circles which extend at least part way across the thickness of the meter wheels between adjacent teeth so as to increase the volume of the transfer pockets; flow recesses in at least one of the measuring chamber walls adjacent the flat end faces of the wheels, a web of said at least one wall separating the flow recesses from one another, the web lying in said plane between the inlet and outlet sides and having a width slightly greater than the greatest width between two adjacent teeth of the wheels, so that the transfer pocket is cut off from the inlet side and the outlet side as it passes through said plane; and a sensor which signals the passage of wheel teeth as the wheels rotate.

Another object of the invention is to obtain reliable signals both at high measuring frequencies and at high operating temperatures.

According to the invention this is solved by a volume sensor for liquids which comprises: a measuring chamber having an inlet side and an outlet side, the two sides being separated by a plane; two toothed meter wheels rotating on respective fixed pivot axes and engaging at their respective pitch circles, said plane being defined by the plane of the two pivot axes; said wheels having flat end faces and the measuring chamber having chamber walls which surround closely the peripheries of the two meter wheels, whereby fluid can only pass from the inlet side to the outlet side of the measuring chamber when carried through said plane in a transfer pocket formed between the teeth of the rotating meter wheels; and a sensor which signals the passage of wheel teeth as the wheels rotate; a bore in a wall of said measuring chamber adjacent to said flat end faces of the metal wheels, in which is located said sensor; a shoulder within said bore and facing into the measuring chamber; and a plate member abutting said shoulder with a sealing material which locates the sensor inside the plate member within the bore, and in close proximity to the surface of the wall and to wheel teeth as they pass.

By way of example, the invention is illustrated in the drawings and will now be described in detail with reference thereto.

BRIEF DESCRIPTION OF THE DRAWINGS

In the drawings:

FIG. 1 shows a volume sensor in longitudinal section through the pivot plane;

FIG. 2 is a half-section along line II—II in FIG. 1;

FIG. 3 shows a meter wheel in partial axial section through a tooth space;

DETAILED DESCRIPTION OF THE DRAWINGS

Figure 4:
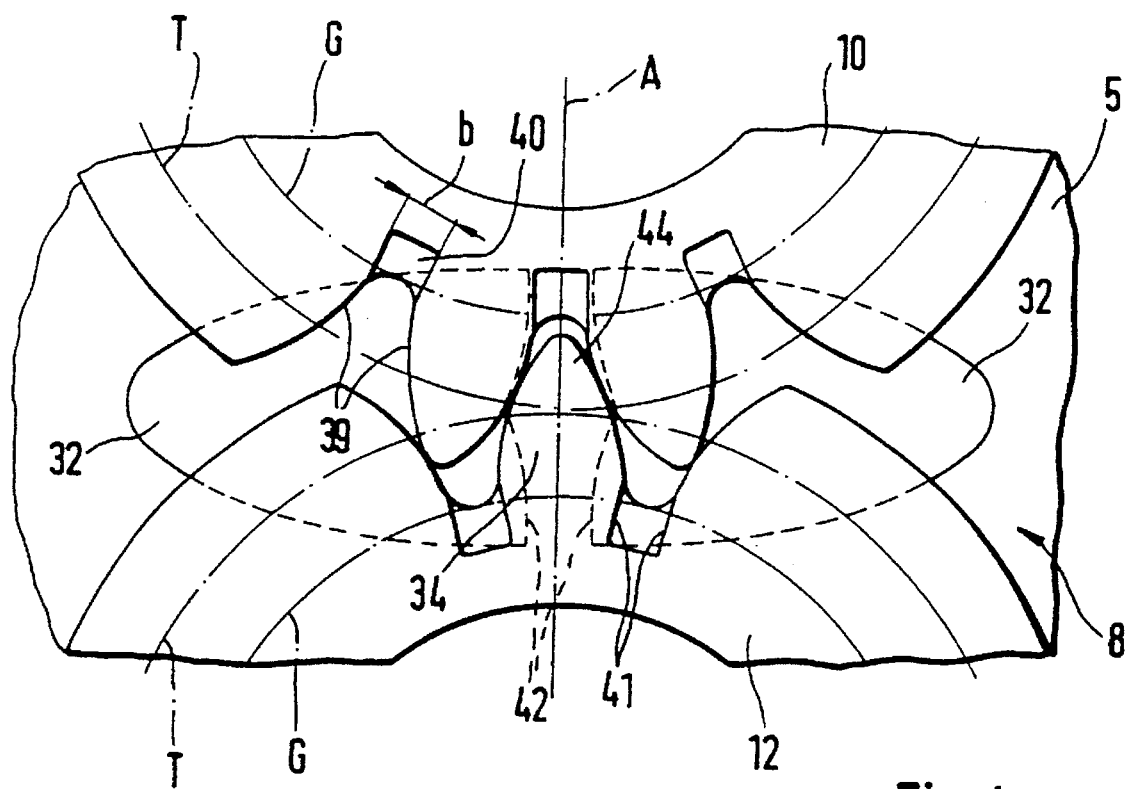
FIG. 4 is a plan view of the engagement region of the meter wheels in the embodiment in FIG. 3.

A volume sensor, shown in FIG. 1 in longitudinal section through the pivot plane, comprises a casing 2 having a middle part 4 and two covers 6 and 8. A measuring chamber 3 is formed in the casing 2, and two round straight-toothed gearwheels serving as meter wheels 10, 12 are mounted for free rotation on stationary pivots 14, 16 in the measuring chamber. The casing covers 6 and 8, on which the measuring-chamber end walls 5, are respectively formed, and the casing part 4 with the peripheral wall 7 of the measuring chamber are sealingly held together by screws 18. Known sealing agents are used for sealing.

The cover 8 is formed with inlet and outlet bores 20 which are parallel to the pivots 14, 16 and are offset relative to the central plane shown in FIG. 1. The arrangement is shown in FIG. 2. As shown, the volume sensor is connected to a plate 22 formed with inlet and outlet bores 24 which are in line with bores 20 and connected to bores 26. The other bores are disposed in mirror relationship to the bores 20, 24 and 26 in the half-casing not shown in FIG. 2.

The meter wheels 10, 12 are mounted via bearing components on the stationary pivots 14 and 16. The bearings provided for this purpose can be sliding bearings 28 as shown at the top of FIG. 1, or ball bearings 30 as shown at the bottom of FIG. 1. In each case, two spaced-apart bearings are used.

The meter wheels are fitted into the casing 2 so that they rotate in the measuring chamber with a small clearance on all sides.

In the region of tooth engagement, shown in FIG. 4, flow paths 32 on both sides of the plane A of the pivot are provided in the measuring-chamber end walls on both the casing covers 6 and 8, and webs 34, described in detail hereinafter, are provided between the flow paths in the plane A. The flow paths 32 are connected at one end to the inlet side and at the other end to the outlet side of the volume sensor.

Figure 6:
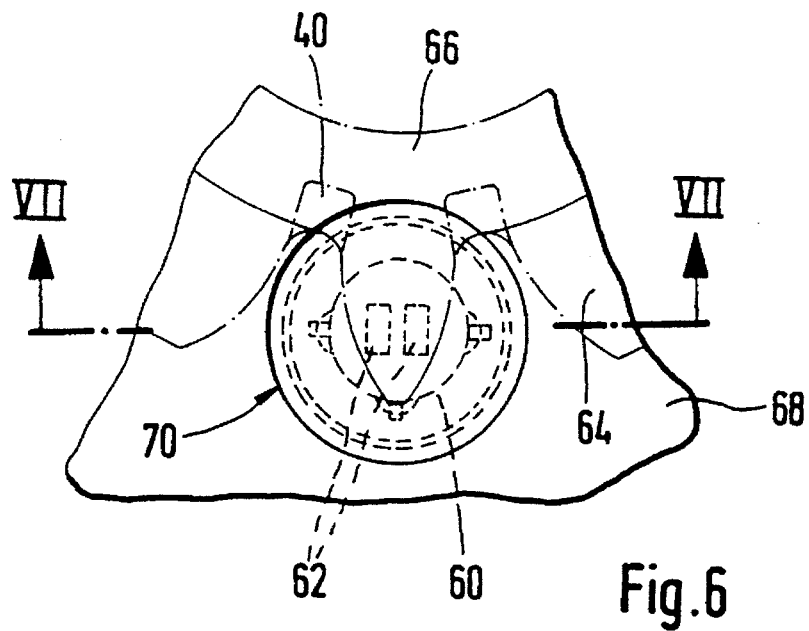
FIG. 6 is a plan view of the end face of the measuring chamber in which the differential magnetoresistor sensor is disposed.

A magneto-electric sensor 60 is disposed in one of the casing covers (cover 6 in the present case, as shown in FIG. 6) and is disposed adjacent the toothed rim of one of the two meter wheels 10,12 and delivers an electric signal for each tooth moving under it. FIG. 1 shows a terminal box 36 for connecting the sensor.

As shown in FIGS. 3 and 4, the meter wheels are provided on both sides in the tooth spaces with a recess 40 which extends radially inwards over the base of the tooth space (root circle G). The width b of the recess is substantially equal to the width of the tooth spaces in the region of the root circle G of the meter wheel. The recess can extend over the entire thickness H of the wheel. Alternatively it can be disposed so that it extends over only a part of the wheel thickness H. Starting from the centre of the wheel, as shown in FIG. 3, the recess can slope downwards on both sides towards the end faces of the wheel. For manufacturing reasons it may be advantageous for the recesses in the bottom of the tooth spaces to be formed with straight parallel side flanks. The recess can then be produced by slotting or grinding.

One important feature of the invention is the design of the webs 34 in the plane of the pivots. The two edges 42 of the web 34 are shaped so that whenever a tooth space of the two meter wheels is in the central position in the pivot plane A, the shape of the opposite flanks of the tooth space and up to the pitch circle T and including the flanks 41 of the recess 40 in the bottom of the tooth space substantially correspond with the shape of the edges 42 on both sides of the web 34, as shown in FIG. 4 in the case of meter wheel 10. In practice the congruent shape is obtained by producing a slight positive overlapping of the web edges by the flanks of the recess and the neighbouring teeth 42 when the teeth of the other wheel engaging in between is in the exact centre position, i.e. the width of the tooth space in this region is slightly less than the width of the web. The overlap should be of the same order as the clearance with which the end faces and the periphery of the gearwheel are fitted into the meter casing. In FIG. 4 this is shown by the small distance between the wheels, shown by chain lines. An optimum shape of the edges is obtained if the edges are disposed and the overlap is dimensioned so that until about 1° before reaching the centre position, an open gap remains and, in the embodiment described, extends from the base of the recess up to the pitch circle, i.e. over the greatest possible length. Liquid can then flow out until shortly before reaching the centre position.

Liquid from the space enclosed by the three teeth shown in FIG. 4 can flow away until just before the centre position is reached, when the web overlaps and consequently the space is completely closed, and when the angle of rotation is about 1°, there is practically no further displacement effect by the tooth 44, which has reached the centre position. Consequently the enclosed liquid is conveyed practically without any increase in pressure from the outflow side to the inflow side of the volume sensor. This greatly reduces the flow resistance across the measured region, which increases rapidly in known volume sensors. Practical tests have shown that volume sensors with a web constructed in the described manner can be operated with low flow resistance over a very wide measuring range. A contributory factor, apparently, is that the recesses 40 increase the total volume of the enclosed space and consequently reduce the compression ratio, i.e. the ratio of the displacement volume, given by the tooth tip above the pitch circle, to the total volume of enclosed liquid. This considerably reduces the compression work, which is the main cause of the flow resistance.

Another result of avoiding compression and decompression of the liquid between the teeth is a considerable reduction in noise. Another point is that, to obtain high resolution, the meter wheels in volume sensors of the aforementioned kind are given small teeth and, assuming a minimum bulk, operate at very high speeds, which in the case of known sensors result in disturbing noise in the medium-frequency range. Conventionally, for example, a tooth travels through the space in the mating wheel in less than 1 ms.

Owing to the construction of the edges of the web and the small web overlap, a large entry cross-section opens very rapidly after passing the centre position, so that the enclosed space on the inlet side of the volume sensor is very quickly re-filled and no negative pressures occur in the enclosed space before complete filling. Another advantageous factor here is that a relatively large volume of liquid is conveyed from the outlet to the inlet side.

Figure 5:
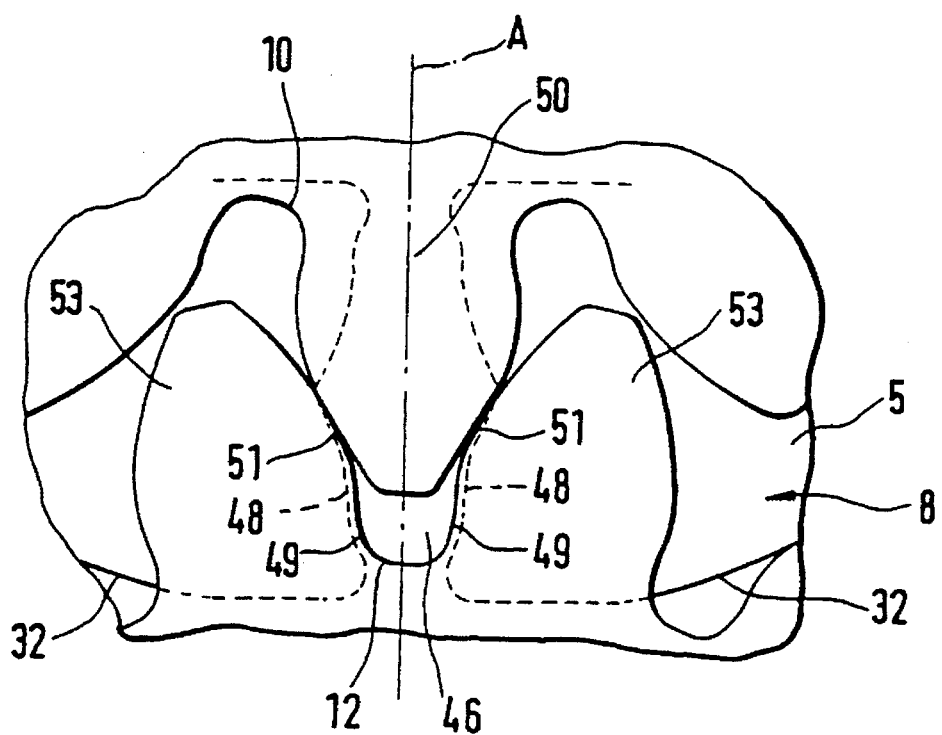
FIG. 5 is a plan view of the engagement region of the meter wheels in another embodiment of the meter wheels.

FIG. 5 shows a modified embodiment of the recesses 46 in the bottom of the tooth space. In FIG. 5, the recesses 46 are formed by a protuberance milling cutter during manufacture of the teeth. The recess therefore extends over the entire thickness of the wheel. As the drawing shows, the edges 48 of the web 50 are as before constructed so that when the teeth of the two meter wheels are in the previously-defined centre position, there is substantial congruence between the flanks 49 of the recess 46 in the base of the tooth space and the opposite flanks 51 of the teeth 53 up to the root circle on the one hand and the edges 48 of the web 50 on the other hand, with a slight positive overlap of the web edges by the teeth 53 of the meter wheel 12.

In the embodiment shown in FIG. 1, the stationary pivot pins 14 and 16 extend through the two casing covers and are provided on the outside with abutments. On one side, the pivot pins 14, 16 have a head 17 which rests on a shoulder in a recess in the surface of the cover. The other end of the pins has a thread 15 on to which a nut 15' can be screwed. The resulting abutment additionally braces the two casing covers in the region of the gearwheels and consequently of the pressurized inner chamber, so that even at high pressures, which in hydraulics can exceed 400 bar, there is no change in the clearance round the end faces of the meter wheels.

The upper pivot pin 14 is shown with an axial bore 52 which opens into a transverse bore 54 lying between the two bearing components 28. A washing liquid can be introduced between the bearing components 58 via a connection 56 and an adjacent bore 58 in the connecting plate 22. This is advantageous, e.g. if a volume sensor is to remain inoperative for a prolonged period. The washing liquid can clean the bearing components and also the spaces between the meter wheels and the casing.

FIG. 6 is a plan view of the differential magnetoresistor sensor 60, hereinafter called the "sensor" for short, disposed with the two parallel magnetoresistors 62 in one of the measuring-chamber end walls in the region of the end face of the teeth 64 of one of the meter wheels 66. In this arrangement, the radius starting from the axis or pivot of the wheel extends between the two magnetoresistors 62 of sensor 60.

Figure 7:
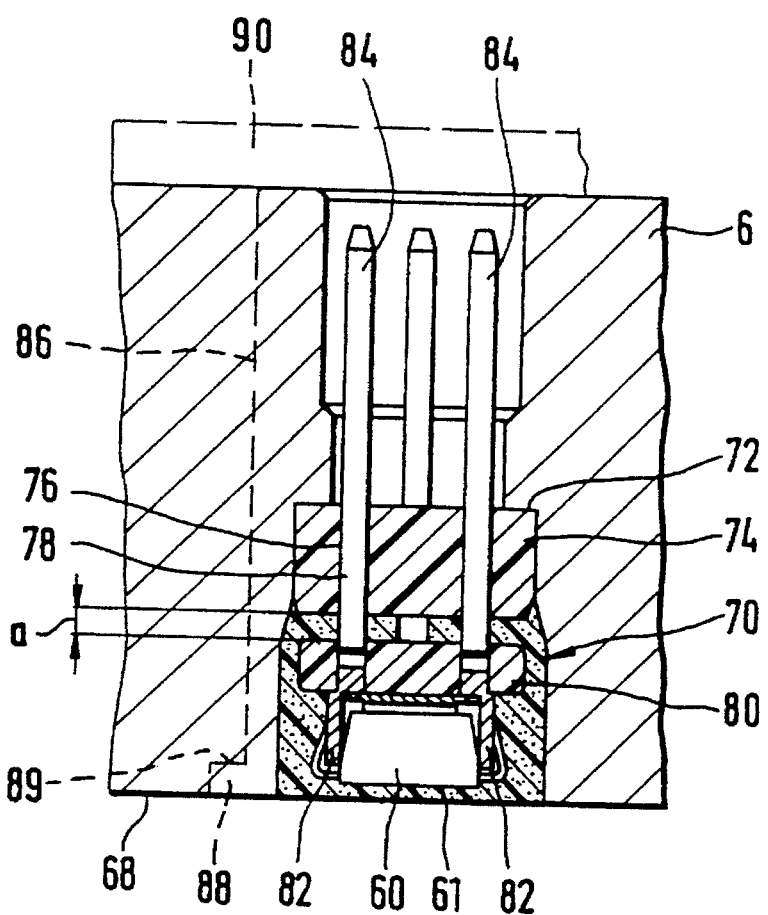
FIG. 7 is a section along line VII—VII in FIG. 6.

As shown in FIG. 7, the casing cover 6 is formed with a bore 70 which extends through the cover and starts from an inside 68 of the cover constituting an end wall of the measuring chamber. In FIG. 7 the bore has a centre step so as to form an annular shoulder 72 facing the measuring chamber in the volume sensor. A pressure-resistant plate 74 of insulating material rests on the shoulder and is formed with perforations 76 for connecting pins 78 for the sensor 60.

The connecting pins 78 are secured in a second plate 80 of insulating material, the diameter of the plate being smaller than the bore diameter under the plate 74. The connecting pins, at their ends 82 guided over the plate 80, bear the sensor 60, whose connections are welded to the connecting pins.

The opposite ends 84 of the connecting pins are disposed and constructed so that a connecting plug can be mounted on them.

The space for the sensor 60 and the plate 80 is dimensioned so that after the sensor 60 permanently connected to plate 80 has been inserted between plate 80 and plate 74 a distance a is left. After the sensor has been installed, the free space between the plate 74 and the inside 68 of the cover is filled with a sealing compound which is rigid at the operating temperature.

In order to protect the sensitive surface of the sensor, a thin wear-resistant plate of non-magnetic material may also be deposited on it. The plate can rest on an annular abutment shoulder and its edge can be formed with an opening for pouring in the sealing compound.

When the sensor is installed in the described manner, the distance between the sensor surface and the end face of the teeth can be reduced to a few tenths of a millimetre, thus greatly increasing the signal stroke. In this manner, reliable signals can be obtained even with quickly-rotating meter wheels and at elevated operating temperatures.

In the drawing, the bore receiving the sensor and its connection is formed in the actual wall of the cover.

Alternatively, of course, these parts can be disposed in a separate bush 86 as shown in broken lines on the left of FIG. 7. The bush can e.g. have a collar 88 for resting on the shoulder 89 of a recess starting from the inside 68 of the cover. The bush can then be stuck in sealing-tight manner into a suitable bore in the cover 6. Alternatively the bush 86 can be formed with an outer annular flange 90 so that it can be inserted from the exterior, the bush being secured by screws through the flange 90. Sensors mounted in a bush 86 in the manner described can also be used in other pressurised casings, such as pressure containers, e.g. for indicating a position, such as the level of a liquid.

I claim:

1. A volume sensor for liquids comprising:

a housing including a measuring chamber having first and second opposing end walls, said first end wall being planar and having an inlet side and an outlet side which are separated by a separating plane extending perpendicular to said first end wall, said first end wall further including an inlet opening in said inlet side and an outlet opening in said outlet side, said inlet opening and said outlet opening having inner edge portions adjacent to said separating plane which cooperate to define a web on said first end wall, said inner edge portions of said inlet opening and said outlet opening being symmetrical on opposite sides of said separating plane;

first and second toothed meter wheels rotatably mounted in said measuring chamber for rotation on respective first and second pivot shafts extending between said first and second ends walls, said first and second pivot shafts being mounted in parallel spaced relation in said measuring chamber wherein said pivot shafts are aligned within said separating plane, said first and second toothed meter wheels including a plurality of teeth wherein outer terminal ends of said teeth define outer peripheral edges of said first and second meter wheels, said measuring chamber further including peripheral chamber walls which are positioned in closely spaced adjacent relation to the outer peripheral edges of said first and second meter wheels, each of said first and second meter wheels further having a first planar end face and a second end face which are respectively disposed in closely spaced adjacent relation to said first and second end walls of said measuring chamber, each of said first and second meter wheels further having a respective pitch circle, and a respective root circle, each of said teeth of said first and second meter wheels having side flanks, each of said first and second meter wheels further having recesses formed between adjacent teeth wherein said recesses extend radially inward of said respective root circle, said recesses including generally parallel side flanks, said teeth of said first and second meter wheels engaging at said pitch circles wherein adjacent engaging teeth cooperate with said measuring chamber to define a transfer pocket of predetermined volume, said first and second meter wheels being operative for transporting a liquid from said inlet opening to said outlet opening in said transfer pocket, said inner edge portions of said inlet and outlet openings substantially corresponding in shape to said side flanks of said recesses and said side flanks of said teeth, said inner edge portions of said inlet opening and said outlet opening being spaced by a distance which is greater than a distance between said side flanks of said adjacent teeth wherein said transfer pocket is isolated from said inlet opening and said outlet opening as said pocket passes through said web; and sensor means fixed in said housing for detecting passage of said teeth of one of said first and second meter wheels as said meter wheel rotates.

2. The volume sensor of claim 1 wherein said sensor comprises a differential magneto-resistor sensor.

3. The volume sensor of claim 1 wherein said recesses in said first and second meter wheels extend across a width of said meter wheels between said first and second end faces.

4. The volume sensor of claim 1 wherein said recesses in said first and second meter wheels include parallel straight side flanks.

5. The volume sensor of claim 1 wherein said recesses in said first and second meter wheels extend across a width of said meter wheels between said first and second end faces, and said recesses angle symmetrical upward from said first and second end faces towards a centerline of said meter wheel.

6. The volume sensor of claim 1 wherein each of said first and second meter wheels is mounted on a respective first and second bearing on said respective first and second pivot shafts, said first and second pivot shafts including a longitudinal bore, and a transverse bore which communicates between said longitudinal bore and a space within the respective bearing, said longitudinal bore including an external inlet connection for introducing a washing fluid into said space within said bearing.

* * * * *